United States Patent
Ye et al.

(10) Patent No.: US 12,309,744 B2
(45) Date of Patent: May 20, 2025

(54) METHODS FOR FLEXIBLE CONFIGURATION OF PAGING OCCASIONS

(71) Applicant: Apple Inc., Cupertino, CA (US)

(72) Inventors: Sigen Ye, Cupertino, CA (US);
Chunxuan Ye, Cupertino, CA (US);
Dawei Zhang, Cupertino, CA (US);
Fangli Xu, Cupertino, CA (US);
Haitong Sun, Cupertino, CA (US);
Huaning Niu, Cupertino, CA (US);
Sethuraman Gurumoorthy, Cupertino, CA (US); Seyed Ali Akbar Fakoorian, Cupertino, CA (US); Wei Zeng, Cupertino, CA (US); Yushu Zhang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 122 days.

(21) Appl. No.: 17/598,129

(22) PCT Filed: Apr. 6, 2021

(86) PCT No.: PCT/CN2021/085576
§ 371 (c)(1),
(2) Date: Oct. 13, 2022

(87) PCT Pub. No.: WO2022/213245
PCT Pub. Date: Oct. 13, 2022

(65) Prior Publication Data
US 2024/0031983 A1    Jan. 25, 2024

(51) Int. Cl.
*H04W 68/02*    (2009.01)
(52) U.S. Cl.
CPC .................... *H04W 68/02* (2013.01)

(58) Field of Classification Search
CPC ....................................................... H04W 68/02
(Continued)

(56) References Cited

U.S. PATENT DOCUMENTS

2022/0264516 A1* 8/2022 He .................. H04W 76/27

FOREIGN PATENT DOCUMENTS

| CN | 112544114 A | 3/2021 |
|---|---|---|
| WO | 2020/216242 A1 | 10/2020 |
| WO | 2022/104657 A1 | 5/2022 |

OTHER PUBLICATIONS

Extended European Search Report and Search Opinion received for European Application No. 21935482.6, mailed on Nov. 25, 2024, 11 pages.

(Continued)

*Primary Examiner* — Joel Ajayi
(74) *Attorney, Agent, or Firm* — Kubota & Basol LLP

(57) ABSTRACT

Methods and systems are disclosed to configure different paging occasions for enhanced UEs that support, and for legacy UEs that do not support, the enhanced feature of the paging early indication (PEI) in paging procedure for 5G/LTE networks. Different paging occasions for the enhanced and legacy UEs may be configured by providing separate paging occasion parameters for the enhanced and legacy UEs. The network may use the separate paging parameters to design the PEI to save signaling overhead. The network may reuse paging format for the paging PDCCH to serve as the PEI that is transmitted in advance of the paging occasions for the enhanced UEs, or may keep legacy paging PDCCH at its current locations to serve as the PEI for the enhanced UEs. A scheduling offset may be configured to separate in time the paging PDCCH serving as the PEI and the paging PDSCH containing the paging message.

12 Claims, 18 Drawing Sheets

(58) Field of Classification Search
USPC .......................................................... 455/458
See application file for complete search history.

(56) References Cited

OTHER PUBLICATIONS

International Preliminary Report on Patentability received for PCT Patent Application No. PCT/CN2021/085576, mailed on Oct. 19, 2023, 5 pages.
International Search Report and Written Opinion received for PCT Patent Application No. PCT/CN2021/085576, mailed on Jan. 6, 2022, 6 pages.
Mediatek Inc: "Paging Enhancements for UE Power Saving in NR", 3GPP Draft; R2-2007190, 3rd Generation Partnership Project (3GPP), Mobile Competence Centre, vol. RAN WG2, No. electronic; Aug. 17, 2020-Aug. 28, 2020, Aug. 7, 2020.
Qualcomm Inc, "Power saving enhancements for paging reception", 3GPP TSG-RAN WG2 Meeting #112-e, R2-2010994, Nov. 2-13, 2020, 5 pages.
Qualcomm Inc, "Power saving enhancements for paging reception", 3GPP TSG-RAN WG2 Meeting #113-e, R2-2100313, Online, Jan. 25-Feb. 5, 2021, 4 pages.
Qualcomm Incorporated: "Paging enhancements for idle/inactive mode UE power saving", 3GPP Draft; R1-2101474, 3rd Generation Partnership Project (3GPP), vol. RAN WG1, No. e-Meeting; Jan. 25, 2021-Feb. 5, 2021 Jan. 19, 2021.
Samsung: "Discussion on paging enhancements", 3GPP Draft; R1-2101217, 3rd Generation Partnership Project (3GPP), vol. RAN WG1, No. e-Meeting; Jan. 25, 2020-Feb. 5, 2020, Jan. 19, 2021.

* cited by examiner

```
PCCH-Config ::=    SEQUENCE {
    defaultPagingCycle              PagingCycle
    nAndPagingFrameOffset           CHOICE {
        oneT                            NULL,
        halfT                           INTEGER (0..1),
        quarterT                        INTEGER (0..3),
        oneEighthT                      INTEGER (0..7),
        oneSixteenthT                   INTEGER (0..15)
    },
    ns                              ENUMERATED {four, two, one},
    firstPDCCH-MonitoringOccasionOfPO   CHOICE {
        sCS15KHZoneT                                                         SEQUENCE (SIZE (1..maxPO-perPF)) OF INTEGER (0..139),
        sCS30KHZoneT- SCS15KHZhalfT                                          SEQUENCE (SIZE (1..maxPO-perPF)) OF INTEGER (0..279),
        sCS60KHZoneT-SCS30KHZhalfT- SCS15KHZquarterT                         SEQUENCE (SIZE (1..maxPO-perPF)) OF INTEGER (0..559),
        sCS120KHZoneT-SCS60KHZhalfT-SCS30KHZquarterT-SCS15KHZoneEighthT      SEQUENCE (SIZE (1..maxPO-perPF)) OF INTEGER (0..1119),
        sCS120KHZhalfT-SCS60KHZquarterT-SCS30KHZoneEighthT-SCS15KHZoneSixteenthT  SEQUENCE (SIZE (1..maxPO-perPF)) OF INTEGER (0..2239),
        sCS120KHZquarterT-SCS60KHZoneEighthT-SCS30KHZoneSixteenthT           SEQUENCE (SIZE (1..maxPO-perPF)) OF INTEGER (0..4479),
        sCS120KHZoneEighthT- SCS60KHZoneSixteenthT                           SEQUENCE (SIZE (1..maxPO-perPF)) OF INTEGER (0..8959),
        sCS120KHZoneSixteenthT                                               SEQUENCE (SIZE (1..maxPO-perPF)) OF INTEGER (0..17919)
    } OPTIONAL,     -- Need R
    ...,
    [[
    nrofPDCCH-MonitoringOccasionPerSSB-InPO- r16      INTEGER  (2..4)      OPTIONAL --
    ]]
    [[
    pagingFrameOffset-enh-r17       INTEGER (0..15)
    ]]
}
```

FIG. 7

```
PCCH-Config        ::=     SEQUENCE {
    defaultPagingCycle          PagingCycle
    nAndPagingFrameOffset       CHOICE {
        oneT                        NULL,
        halfT                       INTEGER (0..1),
        quarterT                    INTEGER (0..3),
        oneEighthT                  INTEGER (0..7),
        oneSixteenthT               INTEGER (0..15)
    },
    ns                          ENUMERATED {four, two, one},
    firstPDCCH-MonitoringOccasionOfPO    CHOICE {
        sCS15KHZoneT-SCS30KHZhalfT-SCS60KHZquarterT-SCS120KHZoneEighthT-SCS15KHZoneSixteenthT    SEQUENCE (SIZE (1..maxPO-perPF)) OF INTEGER (0..139),
        sCS30KHZoneT-SCS60KHZhalfT-SCS120KHZquarterT-SCS15KHZoneEighthT-SCS30KHZoneSixteenthT    SEQUENCE (SIZE (1..maxPO-perPF)) OF INTEGER (0..279),
        sCS60KHZoneT-SCS120KHZhalfT-SCS15KHZquarterT-SCS30KHZoneEighthT-SCS60KHZoneSixteenthT    SEQUENCE (SIZE (1..maxPO-perPF)) OF INTEGER (0..559),
        sCS120KHZoneT-SCS15KHZhalfT-SCS30KHZquarterT-SCS60KHZoneEighthT-SCS120KHZoneSixteenthT   SEQUENCE (SIZE (1..maxPO-perPF)) OF INTEGER (0..1119),
        sCS15KHZhalfT-SCS30KHZquarterT-SCS60KHZoneEighthT-SCS120KHZoneSixteenthT                 SEQUENCE (SIZE (1..maxPO-perPF)) OF INTEGER (0..2239),
        sCS30KHZquarterT-SCS60KHZoneEighthT-SCS120KHZoneSixteenthT                               SEQUENCE (SIZE (1..maxPO-perPF)) OF INTEGER (0..4479),
        sCS60KHZoneEighthT-SCS120KHZoneSixteenthT                                                SEQUENCE (SIZE (1..maxPO-perPF)) OF INTEGER (0..8959),
        sCS120KHZoneSixteenthT                                                                   SEQUENCE (SIZE (1..maxPO-perPF)) OF INTEGER (0..17919)
    } OPTIONAL            -- Need R
    ...,
    [[
    nAndPagingFrameOffset-enh-r17        CHOICE {
        oneT                        NULL,
        halfT                       INTEGER (0..1),
        quarterT                    INTEGER (0..3),
        oneEighthT                  INTEGER (0..7),
        oneSixteenthT               INTEGER (0..15)
    }
    ]]
}
```

FIG. 9

```
PCCH-Config ::=            SEQUENCE {
    defaultPagingCycle         PagingCycle
    nAndPagingFrameOffset      CHOICE {
        oneT                       NULL,
        halfT                      INTEGER (0..1),
        quarterT                   INTEGER (0..3),
        oneEighthT                 INTEGER (0..7),
        oneSixteenthT              INTEGER (0..15)
    },
    ns                         ENUMERATED {four, two, one},
    firstPDCCH-MonitoringOccasionOfPO      CHOICE {
        sCS15KHZoneT
        sCS30KHZoneT- SCS15KHZhalfT
        sCS60KHZoneT-SCS30KHZhalfT- SCS15KHZquarterT
        sCS120KHZoneT-SCS60KHZhalfT-SCS30KHZquarterT-SCS15KHZoneEighthT
        sCS120KHZhalfT-SCS60KHZquarterT-SCS30KHZoneEighthT-SCS15KHZoneSixteenthT
        sCS120KHZquarterT-SCS60KHZoneEighthT-SCS30KHZoneSixteenthT
        sCS120KHZoneEighthT- SCS60KHZoneSixteenthT
        sCS120KHZoneSixteenthT
    } OPTIONAL,          -- Need R
    ...,
    [[
    firstPDCCH-MonitoringOccasionOfPO-enh_r17  {   CHOICE
        sCS15KHZoneT
        sCS30KHZoneT- SCS15KHZhalfT
        sCS60KHZoneT-SCS30KHZhalfT- SCS15KHZquarterT
        sCS120KHZoneT-SCS60KHZhalfT-SCS30KHZquarterT-SCS15KHZoneEighthT
        sCS120KHZhalfT-SCS60KHZquarterT-SCS30KHZoneEighthT-SCS15KHZoneSixteenthT
        sCS120KHZquarterT-SCS60KHZoneEighthT-SCS30KHZoneSixteenthT
        sCS120KHZoneEighthT- SCS60KHZoneSixteenthT
        sCS120KHZoneSixteenthT
    ]]
        OPTIONAL     ,    -- Need R
}

SEQUENCE (SIZE (1..maxPO-perPF)) OF INTEGER (0..139),
SEQUENCE (SIZE (1..maxPO-perPF)) OF INTEGER (0..279),
SEQUENCE (SIZE (1..maxPO-perPF)) OF INTEGER (0..559),
SEQUENCE (SIZE (1..maxPO-perPF)) OF INTEGER (0..1119),
SEQUENCE (SIZE (1..maxPO-perPF)) OF INTEGER (0..2239),
SEQUENCE (SIZE (1..maxPO-perPF)) OF INTEGER (0..4479),
SEQUENCE (SIZE (1..maxPO-perPF)) OF INTEGER (0..8959),
SEQUENCE (SIZE (1..maxPO-perPF)) OF INTEGER (0..17919)

SEQUENCE (SIZE (1..maxPO-perPF)) OF INTEGER (0..139),
SEQUENCE (SIZE (1..maxPO-perPF)) OF INTEGER (0..279),
SEQUENCE (SIZE (1..maxPO-perPF)) OF INTEGER (0..559),
SEQUENCE (SIZE (1..maxPO-perPF)) OF INTEGER (0..1119),
SEQUENCE (SIZE (1..maxPO-perPF)) OF INTEGER (0..2239),
SEQUENCE (SIZE (1..maxPO-perPF)) OF INTEGER (0..4479),
SEQUENCE (SIZE (1..maxPO-perPF)) OF INTEGER (0..8959),
SEQUENCE (SIZE (1..maxPO-perPF)) OF INTEGER (0..17919)
```

FIG. 12

```
PCCH-Config         ::=    SEQUENCE {
    defaultPagingCycle         PagingCycle
    nAndPagingFrameOffset      CHOICE {
        oneT                       NULL,
        halfT                      INTEGER (0..1),
        quarterT                   INTEGER (0..3),
        oneEighthT                 INTEGER (0..7),
        oneSixteenthT              INTEGER (0..15)
    },
    ns                         ENUMERATED {four, two, one},
    firstPDCCH-MonitoringOccasionOfPO   CHOICE {
        sCS15KHZoneT                                                SEQUENCE (SIZE (1..maxPO-perPF)) OF INTEGER (0..139),
        sCS30KHZoneT- SCS15KHZhalfT                                 SEQUENCE (SIZE (1..maxPO-perPF)) OF INTEGER (0..279),
        sCS60KHZoneT-SCS30KHZhalfT- SCS15KHZquarterT                SEQUENCE (SIZE (1..maxPO-perPF)) OF INTEGER (0..559),
        sCS120KHZoneT-SCS60KHZhalfT-SCS30KHZquarterT-SCS15KHZoneEighthT        SEQUENCE (SIZE (1..maxPO-perPF)) OF INTEGER (0..1119),
        sCS120KHZhalfT-SCS60KHZquarterT-SCS30KHZoneEighthT-SCS15KHZoneSixteenthT   SEQUENCE (SIZE (1..maxPO-perPF)) OF INTEGER (0..2239),
        sCS120KHZquarterT-SCS60KHZoneEighthT-SCS30KHZoneSixteenthT  SEQUENCE (SIZE (1..maxPO-perPF)) OF INTEGER (0..4479),
        sCS120KHZoneEighthT- SCS60KHZoneSixteenthT                  SEQUENCE (SIZE (1..maxPO-perPF)) OF INTEGER (0..8959),
        sCS120KHZoneSixteenthT                                      SEQUENCE (SIZE (1..maxPO-perPF)) OF INTEGER (0..17919)
    } OPTIONAL          -- Need R
    ...,
    [[
    nAndPagingFrameOffset-enh- r17      CHOICE {
        oneT                       NULL,
        halfT                      INTEGER (0..1),
        quarterT                   INTEGER (0..3),
        oneEighthT                 INTEGER (0..7),
        oneSixteenthT              INTEGER (0..15)
    },
    ns-enh-r17                 ENUMERATED {four, two, one},
    firstPDCCH- MonitoringOccasionOfPO-enh_r17  {  CHOICE
        sCS15KHZoneT                                                SEQUENCE (SIZE (1..maxPO-perPF)) OF INTEGER (0..139),
        sCS30KHZoneT- SCS15KHZhalfT                                 SEQUENCE (SIZE (1..maxPO-perPF)) OF INTEGER (0..279),
        sCS60KHZoneT-SCS30KHZhalfT- SCS15KHZquarterT                SEQUENCE (SIZE (1..maxPO-perPF)) OF INTEGER (0..559),
        sCS120KHZoneT-SCS60KHZhalfT-SCS30KHZquarterT-SCS15KHZoneEighthT        SEQUENCE (SIZE (1..maxPO-perPF)) OF INTEGER (0..1119),
        sCS120KHZhalfT-SCS60KHZquarterT-SCS30KHZoneEighthT-SCS15KHZoneSixteenthT   SEQUENCE (SIZE (1..maxPO-perPF)) OF INTEGER (0..2239),
        sCS120KHZquarterT-SCS60KHZoneEighthT-SCS30KHZoneSixteenthT  SEQUENCE (SIZE (1..maxPO-perPF)) OF INTEGER (0..4479),
        sCS120KHZoneEighthT- SCS60KHZoneSixteenthT                  SEQUENCE (SIZE (1..maxPO-perPF)) OF INTEGER (0..8959),
        sCS120KHZoneSixteenthT                                      SEQUENCE (SIZE (1..maxPO-perPF)) OF INTEGER (0..17919)
    } OPTIONAL    -- Need R
    ]]
}
```

FIG. 13

METHODS FOR FLEXIBLE CONFIGURATION OF PAGING OCCASIONS

RELATED APPLICATIONS

The present application is the national phase of International Application No. PCT/CN2021/085576, filed on Apr. 6, 2021 and the disclosure of which is hereby incorporated herein by reference in its entirety.

FIELD OF INVENTION

This invention relates generally to the field of wireless communication, and more particularly, to systems and methods for wireless communication devices to be activated from a low power mode to reconnect to a base station in a paging procedure initiated by the base station using an early wake-up indication. Other aspects are also described.

BACKGROUND OF THE INVENTION

In wireless communications networks, a user equipment (UE) may communicate with a base station of the networks by establishing a radio link between the UE and the base station. In the 5G (New Radio or NR) or 4G (LTE) wireless network, a UE may be in a low power state such as in an idle mode when it first camps on a cell of a base station. A UE may also transition to an inactive mode from an active mode to reduce battery consumption. In the inactive mode, the UE may maintain its network context so that the UE may return to the active mode to start transferring application data or signaling messages with minimal latency. The network or the base station may initiate a paging procedure to request the UE to transition to the active mode from the idle mode or the inactive mode when data or signaling for the UE is available. For example, when there is a call arrival or when there is a system information update or a public system warning message, the base station may transmit a paging message to the UE to switch the UE from the inactive mode to the active mode or the core network may initiate a paging procedure to switch the UE from the idle mode to the active mode. The UE may periodically wake up from the inactive or idle mode to listen for the paging messages during a configured paging occasion in a discontinuous reception (DRX) cycle. During the paging occasion, the UE may scan a paging control message transmitted from the base station to determine the existence of paging messages for any one of a group of UEs sharing the same paging occasion. The paging control message may be a paging Physical Downlink Control Channel (PDCCH) that allocates a paging Physical Downlink Shared Channel (PDSCH) containing the paging message. If paging messages exist, the UE may use resource allocation information obtained from the paging control message to scan for a paging message intended for the UE transmitted from the base station. If the UE detects its paging message, the UE may initiate a random access procedure to connect to the base station to transition to the active mode. Otherwise, the paging message may be intended for another UE and the UE remains in the idle mode or the inactive mode.

After waking up from the inactive or idle mode during the paging occasion, the UE may monitor synchronization signals transmitted by the base station to synchronize its time and frequency prior to scanning the paging control message and the paging message. In poor signaling condition, the UE may monitor multiple synchronization signals to achieve sufficient time and frequency synchronization to enable the paging reception, consuming a significant amount of power. Even after achieving time and frequency synchronization, the UE may not detect the paging control message indicating the existence of paging messages or a paging message intended for the UE. To reduce unnecessary paging receptions and to enhance power saving in the inactive or idle mode, an enhancement to the paging procedure is introduced to employ an early wake-up signal knowns as a paging early indication. The base station may transmit the paging early indication in advance of the paging occasion for the UE to indicate to the UE whether to monitor the paging occasion. If the paging early indication indicates that the UE may monitor the paging occasion, the UE may continue with monitoring the synchronization signals, if necessary, and with scanning the paging control message and the paging message. If the paging early indication indicates that the UE does not need to monitor the paging occasion, the UE may go back to the low power mode immediately, eliminating unnecessary paging reception and saving power.

However, not all UEs may support the paging early indication. There may be a mix of UEs that support the paging early indication, referred to as enhanced UEs, and UEs that do not support the paging early indication, referred to as legacy UEs, sharing the same paging occasion. Such scenarios introduce overhead in the paging procedure, limit the design of the paging occasions, and reduce the flexibility of the network to fully utilize the enhancement afforded by the paging early indication without adversely affecting the legacy UEs.

SUMMARY OF THE DESCRIPTION

Methods and systems are disclosed to configure different paging occasions for enhanced UEs that support the enhanced feature of the paging early indication in paging procedure and for legacy UEs that do not support the enhanced features in 5G/LTE network. Designs and mechanisms to separate the paging occasions for enhanced UEs and legacy UEs are disclosed, allowing flexibility in the implementation of the paging early indication without the overhead imposed by having to accommodate the legacy UEs in the same paging occasion. The network may optimize the configuration of the paging occasions for the UEs in the network, allowing the enhanced UEs to take full advantage of the paging early indication while reducing any adverse effect on the power consumption of the legacy UEs.

Mechanisms to provide different paging occasions for the enhanced UEs and legacy UEs may include providing separate paging occasion parameters for the enhanced UEs from the legacy UE. For example, paging control channel (PCCH)-Configuration structures within the System Information Block (SIB) broadcast by the 5G/4G networks provide the parameters for the UEs to determine the paging frames and the paging occasions within the paging frames. The parameters in the PCCH-Configuration may include the parameter used to derive the number of total paging frames (N) in each DRX cycle (T) duration of the radio frames, the parameters for the frame offset (PF_offset) in radio frames used for the paging frame determination, the number of paging occasions (Ns) per paging frame, and the first Physical Downlink Control Channel (PDCCH) monitoring occasion associated with a specific paging occasion. The PDCCH monitoring occasion is associated with the Ns paging occasions per page frame during which UEs may detect the PDCCH to determine the existence of paging messages for the UEs sharing the same paging occasion. The PDCCH used for paging may contain downlink control information (DCI) format 1_0 to allocate resources for the PDSCH carrying the paging message. The paging PDCCH may also be referred to as the paging control message. The network or the base station may separately configure the same set or a subset of the parameters of the PCCH-Configuration for the enhanced UEs so that the enhanced UEs and the legacy UEs may have different paging occasions.

In one aspect, the network or the base station may configure the frame offset (PF_offset) separately for the enhanced UEs such that the legacy UEs and the enhanced UEs may have non-overlapping paging frames. In one aspect, the network or the base station may configure both the number of total paging frames (N) in each DRX cycle and the PF_offset separately for the enhanced UEs. The number of paging frames (N) within each DRX cycle may be interpreted as the number of paging groups within each DRX cycle. The number of paging groups for the enhanced UEs and the legacy UEs within each DRX cycle may be different to allow the network or the base station further flexibility in configuring the paging frames based on the expected paging load for the enhanced UEs and legacy UEs. In one aspect, the network or the base station may configure the number of paging occasions (Ns) separately for the enhanced UEs such that the legacy UEs and the enhanced UEs may have non-overlapping paging occasions within the same paging frame.

In one aspect, the network or the base station may configure the first PDCCH monitoring occasions separately for the enhanced UEs. The legacy UEs and the enhanced UEs may have non-overlapping PDCCH monitoring occasions within the same paging frame. In one aspect, the network or the base station may configure any combination of the PF_offset, N, Ns, the PDCCH monitoring occasions separately for the enhanced UEs when configuring the paging occasions. In one aspect, the network or the base station may configure separately for the legacy UEs the number of PDCCH monitoring occasions per synchronization signal block (SSB) that is provided apart from the PCCH-Configuration parameters.

The network or the base station may use the separate paging parameters configured in the PCCH-Configuration structure to design the page early indication to save signaling overhead. In one aspect, the network or the base station may reuse the existing paging DCI format of the paging PDCCH to serve as the paging early indication that is transmitted in advance of the paging occasions for the enhanced UEs. Legacy paging PDCCHs during which there are no paging occasions configured for the legacy UEs may not need to be transmitted. In one aspect, the network or the base station may configure a scheduling offset between the paging early indication and the paging Physical Downlink Shared Channel (PDSCH) containing the paging message. The scheduling offset may be a slot offset that may be used by the enhanced UEs to derive the slot in which the paging PDSCH containing the paging message for the enhanced UEs is transmitted. The network or the base station may broadcast the scheduling offset in SIB as part of the paging configuration. In one aspect, the paging format for the paging early indication may be enhanced to provide subgrouping for a group of enhanced UEs.

In one aspect, the network or the base station may keep legacy paging PDCCHs at their current locations to serve as paging early indication for the enhanced UEs. The network or the base station may configure a scheduling offset between the paging early indication indicated by a legacy paging PDDCH and the paging PDSCH containing the paging message. The scheduling offset allows the paging PDCCH and the paging PDSCH to be separated far enough so that the paging PDCCH may serve as the paging early indication. After waking up, if the enhanced UE does not detect a paging PDCCH, the enhanced UE may go back to the low power mode immediately. Otherwise, the enhanced UE may continue with any needed detection of synchronization signals to synchronize its time and frequency and to detect the paging PDSCH.

Advantageously, compared to scenarios when there is a mix of legacy UEs and enhanced UEs sharing the same paging occasion, there is no additional overhead needed to support the functionality of the paging early indication when the paging occasions for the legacy UEs and enhanced UEs are configured to have non-overlapping paging occasions. The network or the base station reuses existing paging format for the paging PDCCH to support the functionality of the paging early indication enhanced with the scheduling offset to allow sufficient time between the paging early indication and the paging message carried by the paging PDSCH. Overhead is reduced because legacy paging PDCCHs or legacy paging PDSCHs during which there are no paging occasions configured for the legacy UEs may not need to be transmitted. The overhead saving may be significant in a beam-based operation when the paging early indication may need to be transmitted in all the beams.

BRIEF DESCRIPTION OF THE DRAWINGS

The present invention is illustrated by way of example and not limitation in the figures of the accompanying drawings in which like references indicate similar elements.

FIG. 7 illustrates an example of providing separate configuration parameters for the frame offset (PF_offset) for the enhanced UEs in the PCCH-Configuration structure, according to one aspect of the disclosure.

FIG. 9 illustrates an example of providing separate configuration parameters for both the number of total paging frames (N) in each DRX cycle and the frame offset (PF_offset) for the enhanced UEs in the PCCH-Configuration structure, according to one aspect of the disclosure.

FIG. 12 illustrates an example of providing separate configuration parameters for the first PDCCH monitoring occasion for the enhanced UEs in the PCCH-Configuration structure, according to one aspect of the disclosure.

FIG. 13 illustrates an example of providing separate configuration parameters for the frame offset (PF_offset), the number of total paging frames (N) in each DRX cycle, the number of paging occasions (Ns), and the PDCCH monitoring occasions separately for the enhanced UEs in the PCCH-Configuration structure, according to one aspect of the disclosure.

DETAILED DESCRIPTION

Figure 1:
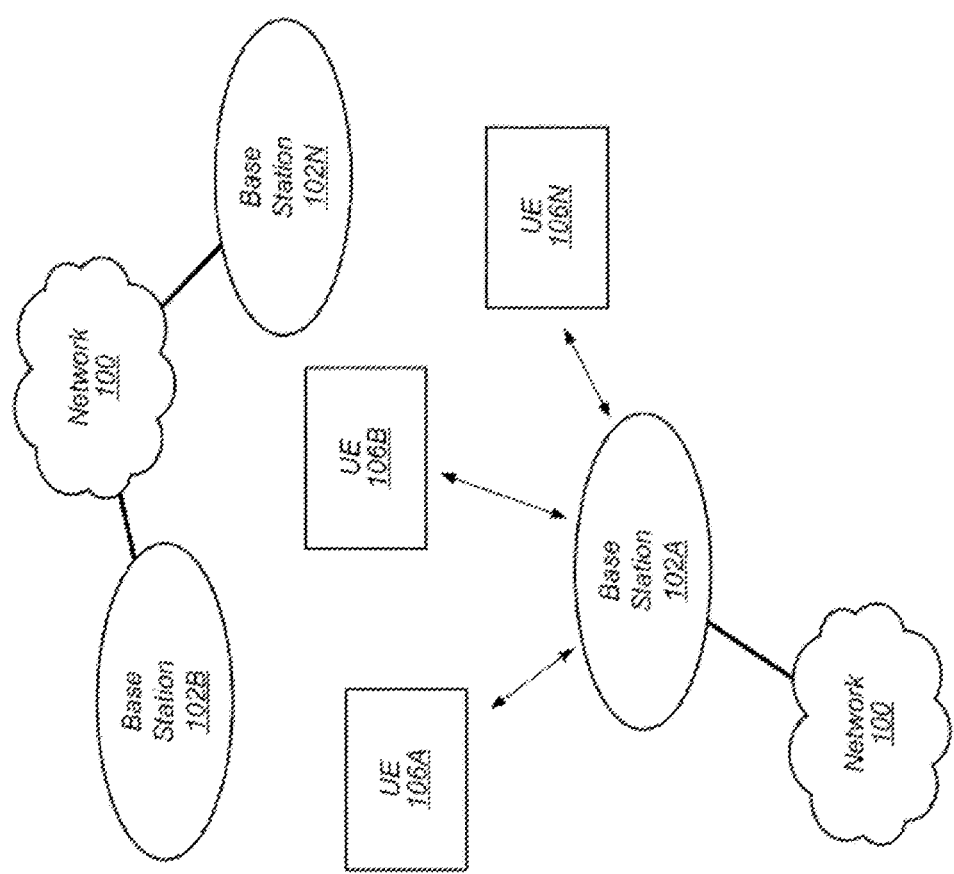
FIG. 1 illustrates an example wireless communication system according to one aspect of the disclosure.

Methods and systems are disclosed to configure different paging occasions in 5G or LTE wireless networks for enhanced UEs that support the enhancement of using the paging early indication (PEI) in paging procedure and for legacy UEs that do not support the enhanced features. The core network or a base station of the network may configure paging parameters for a UE and may initiate the paging procedure to request the UE to transition to the active mode (e.g., radio resource control (RRC) connected mode) from the low power mode (e.g., RRC idle mode or the RRC inactive mode) when data or signaling for the UE is available. Based on the configured paging parameters, the UE may determine a paging frame within the radio frames of a DRX cycle and a paging occasion within the paging frame during which the UE periodically wakes up from the low power state (e.g., sleep) to monitor or listen for paging messages. The UE monitors one paging occasion per DRX cycle. To enhance power saving, the base station may transmit the PEI to indicate to an enhanced UE in advance of the configured paging occasion whether the enhanced UE needs to monitor the paging occasion to listen for paging messages. Separating the paging occasions for the groups of enhanced UEs and legacy UEs provides the network flexibility in the implementation of the paging configuration. The network may more effectively configure the paging occasions for the UEs in the network, allowing the enhanced UEs to take full advantage of the PEI while reducing any adverse effect on the power consumption of the legacy UEs.

In one aspect, mechanisms to provide separate paging occasions for the enhanced UEs and legacy UEs may include providing separate paging occasion configuration parameters for the enhanced UEs from the legacy UEs. The network may broadcast the paging parameters using the PCCH-Config structure within the SIB1. The paging parameters may include the number of total paging frames (N) in each DRX cycle, the frame offset (PF_offset) used for determining the paging frame, the number of paging occasions (Ns) per paging frame, and the first PDCCH monitoring occasion associated with a paging occasion. A UE may calculate its paging frame and paging occasion based on a combination of the paging parameters and its allocated identifier information (e.g., System Temporary Mobile Subscriber Identify (5G-S-TMSI)). At each paging occasion, the UE may scan for a PDCCH transmission containing downlink control information (DCI) format 1_0 that provides resource allocations for paging messages. If detected, the UE may determine if there exists a paging message and may receive the PDSCH containing the paging message based on the resource allocation carried by the DCI format 1_0. To distribute the load generated by the paging procedure, the network may divide the UEs into groups such that each group of UEs monitors a different paging occasion.

The network may separately provide the same set or a subset of the parameters of the PCCH-Config structure, such as N, PF_offset, Ns, the first PDCCH monitoring occasion, for the enhanced UEs so the network may configure the enhanced UEs and the legacy UEs with different paging frames or different paging occasions within the same paging frame. An enhanced UE may determine its paging occasion based on the parameters for the enhanced UEs. When the enhanced UE receives the PEI in advance of its scheduled paging occasion, the enhanced UE determines if it should monitor the paging occasion. If so, the enhanced UE continues with monitoring synchronization signals, if necessary, and with receiving the PDCCH containing resource allocations for a paging message and PDSCH carrying the paging message during the scheduled paging occasion. If the PEI indicates that the enhanced UE does not need to monitor the paging occasion, the enhanced UE may to go back to sleep to save power. A legacy UE may determine its paging occasion based on the parameters for the legacy UEs. The legacy UE may monitor the paging PDCCH and paging PDSCH during the scheduled paging occasion that is different from the paging occasion for the enhanced UEs to determine the existence of a paging messages for the legacy UE.

The network may use the separate paging parameters for the enhanced UEs and legacy UEs to design the PEI to save signaling overhead. In one aspect, after using the separate paging occasion configuration parameters to configure the enhanced UEs and legacy UEs with different paging occasions, the network may reuse the existing paging format (e.g., DCI format 1_0) for the paging PDCCH to serve as the PEI because the scheduled paging occasion during which the enhanced UEs may listen for the paging PDCCH is not shared with legacy UEs. Thus, during the scheduled paging occasion for the enhanced UEs, the paging PDCCH for the legacy UEs does not need to be transmitted. In one aspect, the network may configure a large scheduling offset between the paging PDCCH serving as the PEI and the paging PDSCH containing the paging message for the enhanced UEs. The network may broadcast the scheduling offset in SIB as part of the paging configuration.

In one aspect, the network may keep the legacy paging PDCCH at its current position to serve as the PEI for the enhanced UEs. The legacy paging PDCCH does not contain the resource allocation for the legacy paging PDSCH containing the paging message for the legacy UEs because the legacy paging PDSCH is not monitored by the legacy UEs. The network may configure a scheduling offset between the legacy paging PDCCH serving as the PEI and the paging PDSCH containing the paging message for the enhanced UEs. The network may similarly broadcast the scheduling offset in SIB as part of the paging configuration. Paging overhead is reduced compared to the scenario when a mix of enhanced UEs and legacy UEs share the same paging occasion because there is no additional overhead to support the PEI. This is because the network reuses existing paging format for the paging PDCCH to support the functionality of the PEI by separating the paging PDCCH serving as the PEI and the paging PDSCH sufficiently in time. The overhead saving may be significant in a beam-based operation when the PEI may need to be transmitted in all the beams.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

FIG. 1 illustrates a simplified example wireless communication system according to one aspect of the disclosure. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
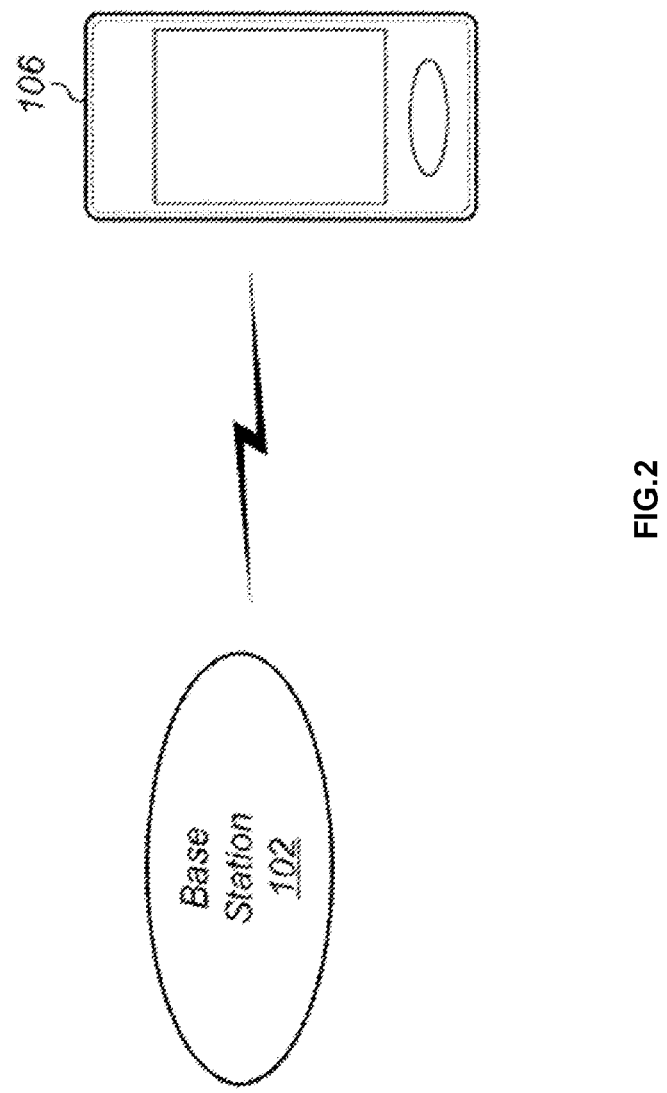
FIG. 2 illustrates user equipment in direct communication with a base station (BS) according to one aspect of the disclosure.

FIG. 2 illustrates a UE 106 in direct communication with a base station 102 through uplink and downlink communications according to one aspect of the disclosure. The UE 106 may be a device with cellular communication capability such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
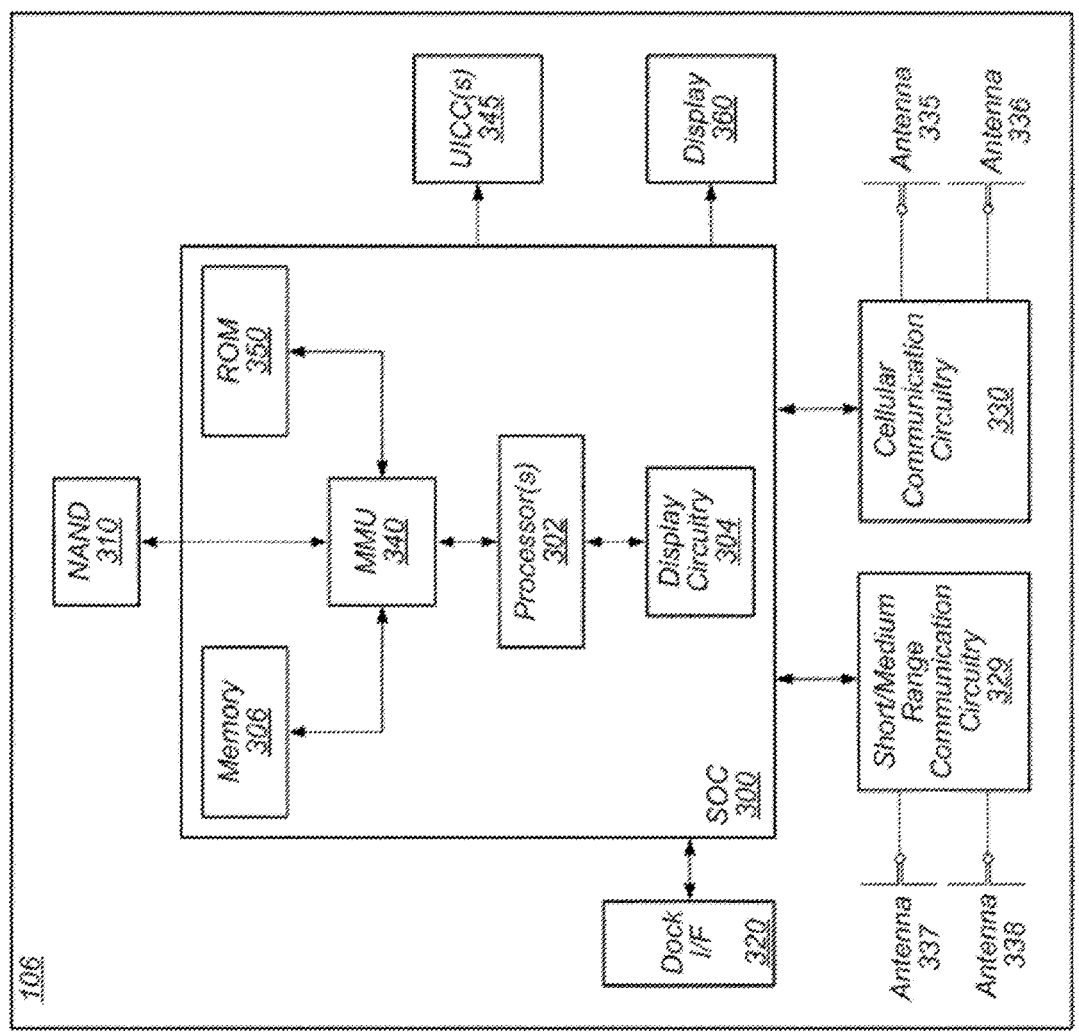
FIG. 3 illustrates an example block diagram of a UE according to one aspect of the disclosure.

FIG. 3 illustrates an example simplified block diagram of a communication device 106 according to one aspect of the disclosure. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition), the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
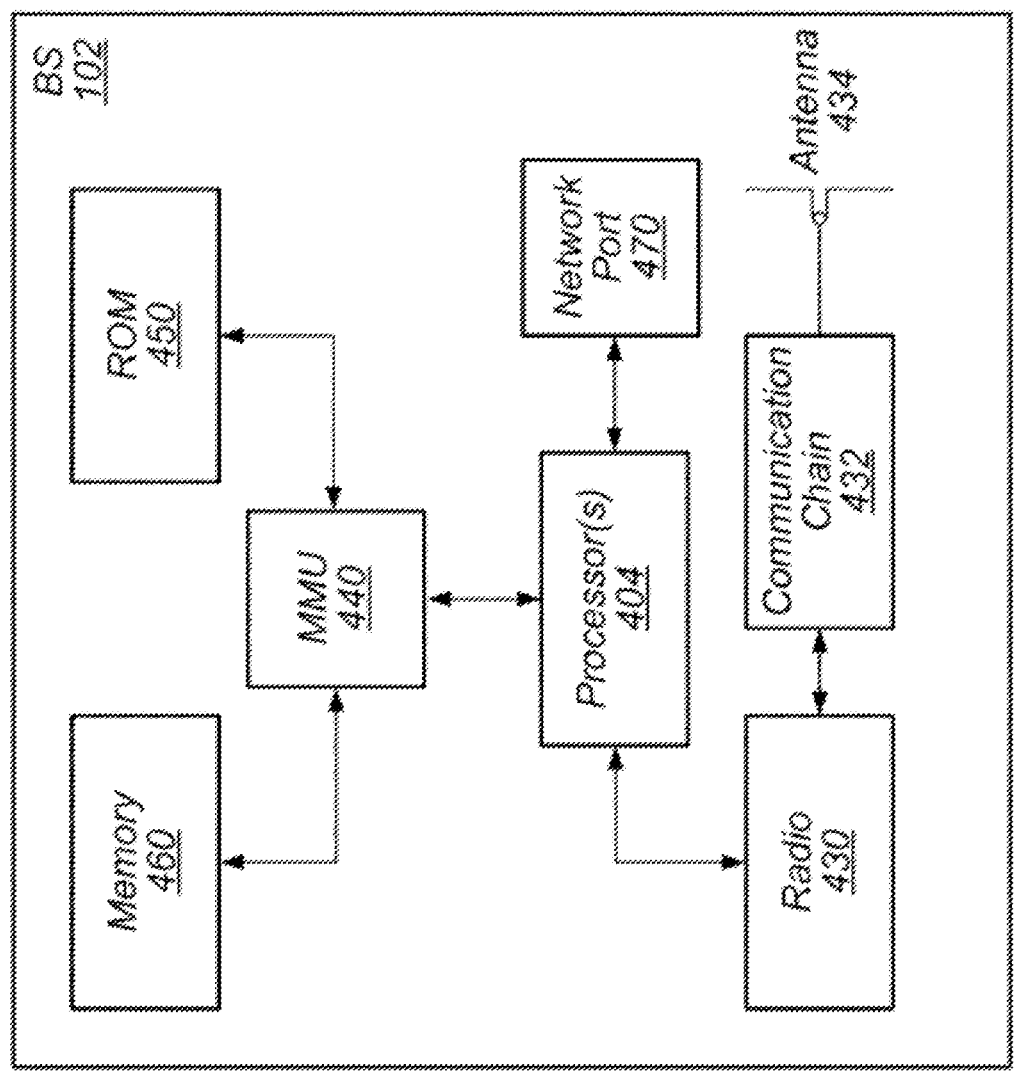
FIG. 4 illustrates an example block diagram of a BS according to one aspect of the disclosure.

FIG. 4 illustrates an example block diagram of a base station 102 according to one aspect of the disclosure. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UEs 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UEs 106. In some cases, the network port 470 may couple to a telephone network via the core network, and/or the core network may provide a telephone network (e.g., among other UEs serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UEs 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
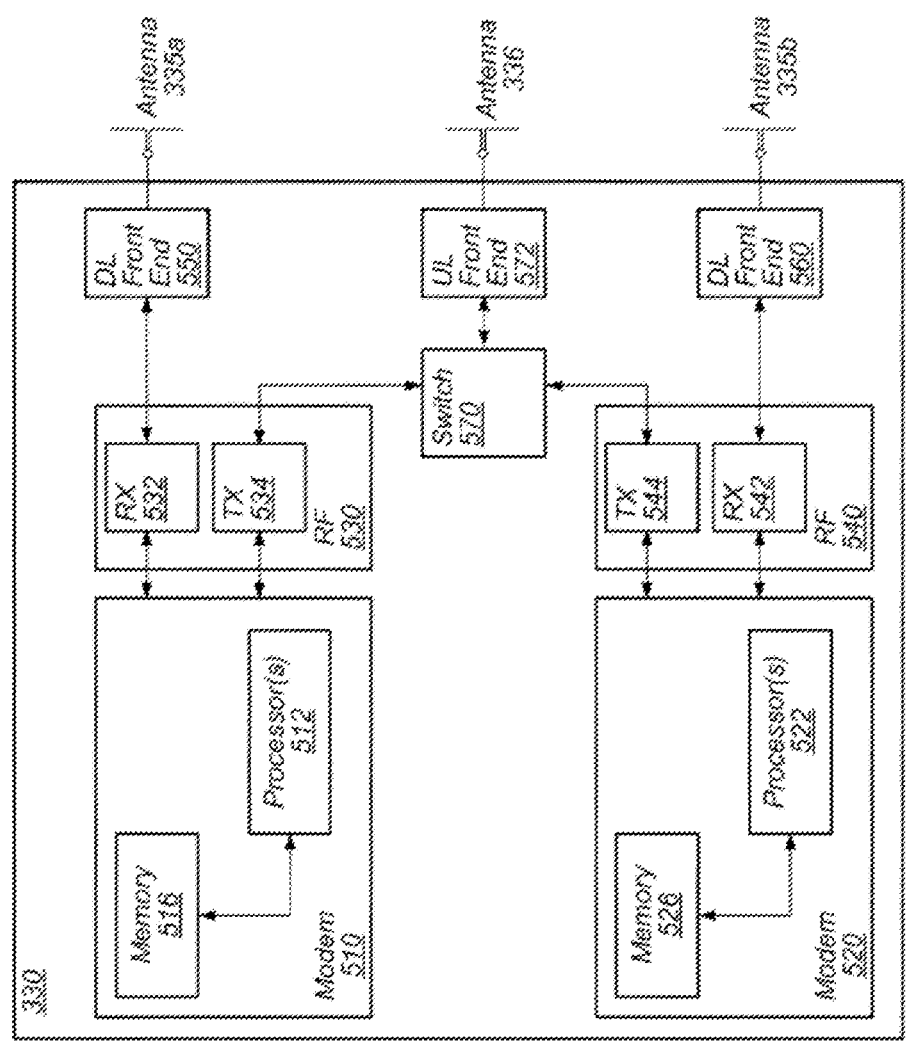
FIG. 5 illustrates an example block diagram of cellular communication circuitry according to one aspect of the disclosure.

FIG. 5 illustrates an example simplified block diagram of cellular communication circuitry according to one aspect of the disclosure. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition), the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition), the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Mechanisms to provide different paging occasions for the enhanced UEs and legacy UEs may include providing separate paging occasion parameters for the enhanced UEs from the legacy UE. For example, paging control channel (PCCH)-Configuration structures within the System Information Block (SIB) broadcast by the 5G/4G networks provide the parameters for the UEs to determine the paging frames and the paging occasions within the paging frames. The parameters in the PCCH-Configuration may include the parameters used to derive the number of total paging frames (N) in each DRX cycle (T) duration of the radio frames, the parameters for the frame offset (PF_offset) in radio frames used for the paging frame determination, the number of paging occasions (Ns) per paging frame, and the first Physical Downlink Control Channel (PDCCH) monitoring occasion associated with a specific paging occasion (firstPDCCH-MonitoringOccasionOfPO).

There may be a maximum of 4 paging occasions per frame. Each paging occasion may include a set of 'S' consecutive PDCCH monitoring occasions for all beams and may contain multiple time slots (e.g., subframes or OFDM symbols). A PDCCH monitoring occasion may be a sequence of OFDM symbols for monitoring PDCCH for paging. Each paging occasion is linked to a search space within which the PDCCH for paging, also referred to as paging PDCCH, may be transmitted. The search space for paging PDCCH is configured using the pagingSearchSpace information element within the PDCCH-ConfCommon parameter structure belonging to SIB1.

If the search space is set to 0, then paging and SIB1 share the same search space. The PDCCH monitoring occasions for paging are the same as for SIB1. The period of the search space of the PDCCH transmissions for SIB1 may be equal to the period of the synchronization signal/physical broadcast channel (SS/PBCH) block (SSB). Thus, the number of paging frames (N) per DRX cycle may be the same as the number of SSB per beam within each DRX cycle. Each of the 'S' PDCCH monitoring occasions inside the paging occasion may correspond to one SSB. Ns, the number of paging occasions per paging frame. is restricted to 1 or 2 when paging and SIB1 share the same search space. For Ns=1, there is a single paging occasion associated with each paging frame and the single paging occasion starts from the first PDCCH monitoring occasion in the paging frame. If the period for the SSB is 5 ms, then there may be 2 paging occasions per paging frame. In this case Ns=2. Paging occasion is either in the first half paging frame or the second half paging frame. Half of the UEs within the paging group may use the first paging occasion while the other half may use the second paging occasion. The firstPDCCH-MonitoringOccasionOfPO information element in the PCCH-Configuration parameter structure is not needed when paging and SIB1 share the same search space.

If the search space is set to 1, then paging and SIB1 do not share the same search space. Ns, the number of paging occasions per paging frame, may be set to 1, 2, or 4. Thus, there may be up to 4 paging occasions per paging frame. The search space may be configured so that are sufficient PDCCH monitoring occasions to match the number of paging occasions. The firstPDCCH-MonaoringOccasionOfPO information element in the PCCH-Configuration parameter structure may provide a sequence of up to 4 values corresponding to the up to 4 paging occasions.

The network or the base station may separately configure the same set or a subset of the parameters of the PCCH-Configuration for the enhanced UEs so that the enhanced UEs and the legacy UEs may have different paging occasions. A UE may calculate its paging frame and paging occasion based on a combination of the paging parameters and its allocated identifier information (e.g., 5G-S-TMSI). For example, the UE may calculate its paging frame (SFN) based on the equation $(SFN+PF\_offset) \bmod T = (T/N) \times ((5G\text{-}S\text{-}TMSI \bmod 1024) \bmod N)$. The UE may calculate the index of the paging occasion in the paging frame by $i\_s = \text{floor}((5G\text{-}S\text{-}TMSI \bmod 1024)/N) \bmod Ns$. As mentioned, inside the paging occasion, there may be 'S' consecutive PDCCH monitoring occasions. Each PDCCH monitoring occasion may correspond to one SSB. The UE may monitor all the PDCCH monitoring occasions transmitted through different beams to monitor paging messages. The UE may assume that the same paging message is repeated in all transmitted beams or PDCCH monitoring occasions. At the PDCCH monitoring occasions within each paging occasion, the UE may scan for a PDCCH transmission containing DCI format 1_0 that has its cyclic redundancy check (CRC) scrambled by the paging radio network temporary identifier (P-RNTI). The DCI format 1_0 is used to allocate PDSCH resources for a paging message. If detected, the UE reads a short message indicator field to determine if the short message indicator indicates the existence of a paging message (e.g., 01 or 11). If so, the UE may receive the PDSCH based on the resource allocation decoded from the PDCCH. The PDSCH may carry a paging message addressed to a list of UEs specified by a paging record list. If the UE finds its identifier (e.g., UE_ID) in the paging record list, then the UE may start a random access procedure to make RRC connection or reconnection with the base station. Otherwise, the UE stays in the RRC idle or RRC inactive mode.

Figure 6:
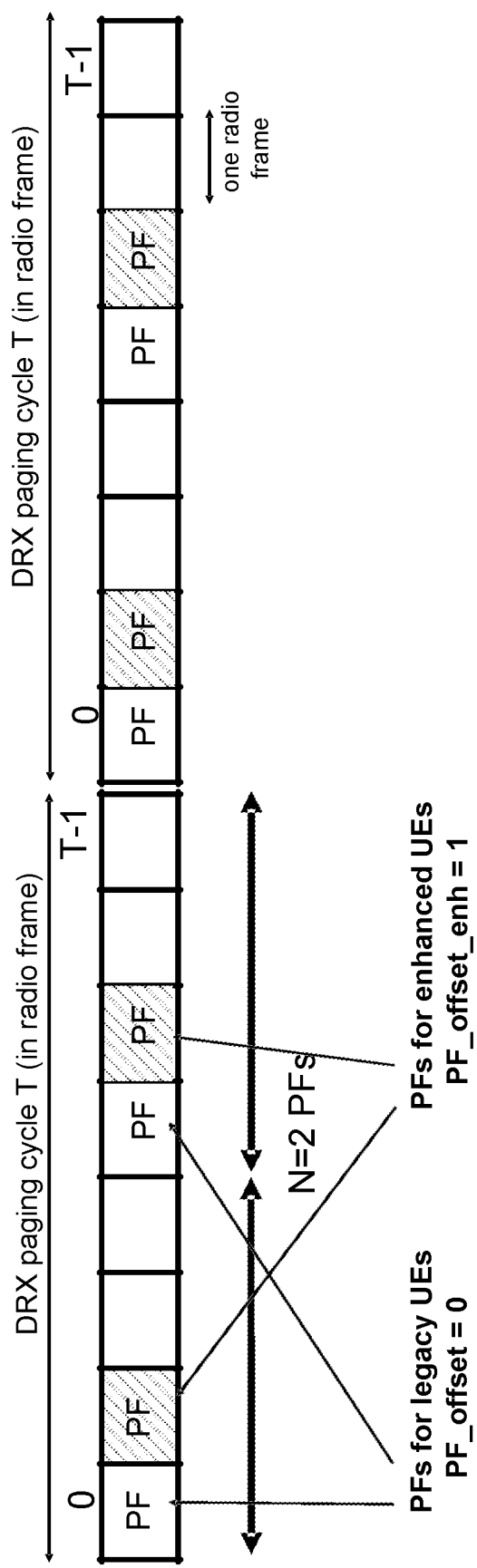
FIG. 6 depicts non-overlapping paging frames and paging occasions between the legacy UEs and enhanced UEs when the frame offset (PF_offset) is configured separately for the enhanced UEs, according to one aspect of the disclosure.

FIG. 6 depicts non-overlapping paging frames and paging occasions between the legacy UEs and enhanced UEs when the frame offset (PF_offset) is configured separately for the enhanced UEs, according to one aspect of the disclosure.

There are two paging frames (N) in each DRX cycle (T) duration of the radio frames. The number of paging frames (N) within each DRX cycle may be interpreted as the number of paging groups within each DRX cycle. The frame offset (PF_offset) for the legacy UEs is configured to 0. The PF_offset for the enhanced UEs is configured to 1. The number of paging groups and so the number of paging frames for the enhanced UEs and the legacy UEs within each DRX cycle is the same. This may have the smallest signaling overhead for providing separate paging occasions for the legacy UEs and enhanced UEs, but it may not provide the network or the base station with the flexibility of configuring the number of paging frames for the legacy and enhanced UEs separately.

FIG. 7 illustrates an example of providing separate configuration parameters for the frame offset (PF_offset) for the enhanced UEs shown as information element pagingFrameOffset-enh-r17 in the PCCH-Configuration structure, according to one aspect of the disclosure.

Figure 8:
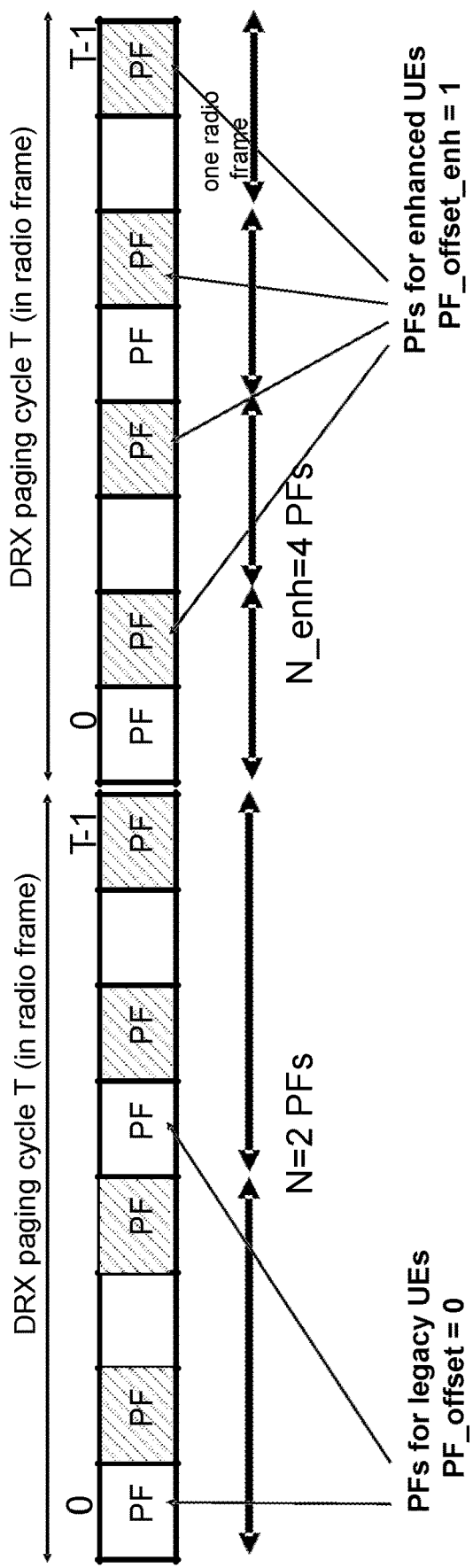
FIG. 8 depicts non-overlapping paging frames and paging occasions between the legacy UEs and enhanced UEs when both the number of total paging frames (N) in each DRX cycle and the frame offset (PF_offset) are configured separately for the enhanced UEs, according to one aspect of the disclosure.

FIG. 8 depicts non-overlapping paging frames and paging occasions between the legacy UEs and enhanced UEs when both the number of total paging frames (N) in each DRX cycle and the frame offset (PF_offset) are configured separately for the enhanced UEs, according to one aspect of the disclosure.

There are two paging frames (N) in each DRX cycle (T) duration of the radio frames for the legacy UEs and four paging frames (N_enh) in each DRX cycle for the enhanced UEs. The frame offset (PF_offset) for the legacy UEs is configured to 0. The PF_offset for the enhanced UEs is configured to 1. The number of paging groups and so the number of paging frames for the enhanced UEs and the legacy UEs within each DRX cycle are different. This provides the network or the base station with flexibility in configuring the paging frames based on the expected paging load for the enhanced UEs and legacy UEs.

FIG. 9 illustrates an example of providing separate configuration parameters for both the number of total paging frames (N) in each DRX cycle and the frame offset (PF_offset) for the enhanced UEs shown as information element nAndPagingFrameOffset-enh-r17 in the PCCH-Configuration structure, according to one aspect of the disclosure.

Figure 10:
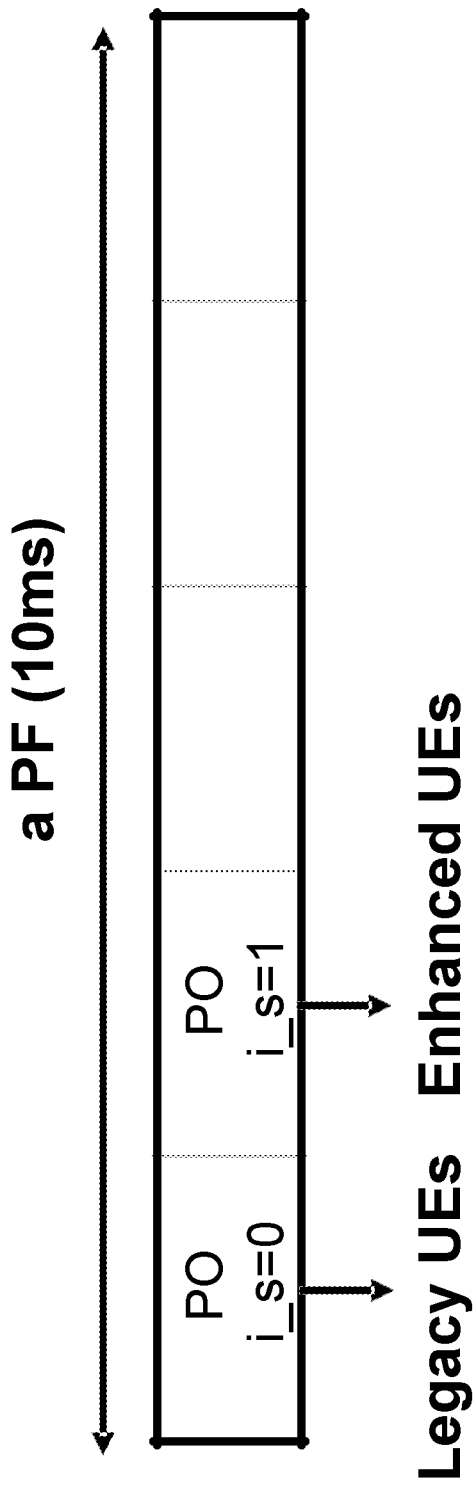
FIG. 10 depicts non-overlapping paging occasions between the legacy UEs and enhanced UEs when the number of paging occasions (Ns) is configured separately for the enhanced UEs, according to one aspect of the disclosure.

FIG. 10 depicts non-overlapping paging occasions between the legacy UEs and enhanced UEs when the number of paging occasions (Ns) is configured separately for the enhanced UEs, according to one aspect of the disclosure.

In one aspect, Ns_enh is the total number of paging occasions for the legacy and enhanced UEs, and it may be configured larger than Ns, the number of paging occasions for the legacy UEs. The enhanced UEs may use the $(Ns+1)^{th}$ to $(Ns\_enh)^{th}$ paging occasions in the paging frame. For example, if Ns is configured to be 1 and Ns_enh is configured to be 2, the legacy UEs may use the first paging occasion in the paging frame according to existing behavior. For enhanced UEs, the index of the paging occasion in the paging frame may be determined by $i\_s = \text{floor}(UE\_ID/N) \mod (Ns\_enh - Ns) + Ns$, where UE_ID may be the 5G-S-TMSI modulo 1024 and N is the number of total paging frames in the DRX cycle (T).

In one aspect, Ns_enh is the number of paging occasions for the enhanced UEs only. For example, Ns is configured to be 1 and Ns_enh is also configured to be 1. For enhanced UEs, the index of the paging occasion in the paging frame may be determined by $i\_s = \text{floor}(UE\_ID/N) \mod Ns\_enh + Ns$. However, the flexibility of using the Ns to configure separately the paging occasions for the enhanced UEs may be limited because the total number of paging occasions (Ns) in a paging frame may only take the value of 1, 2, or 4, and the value may be limited to 1 or 2 if the common search space type 0 is used for paging when the paging search space shares a search space with search space set 1 used for the System Information Block 1 (SIB1). If the common search space type 0 is not used for paging, the total number of paging occasions in a paging frame may be extended to support more paging occasions to provide additional flexibility.

Figure 11:
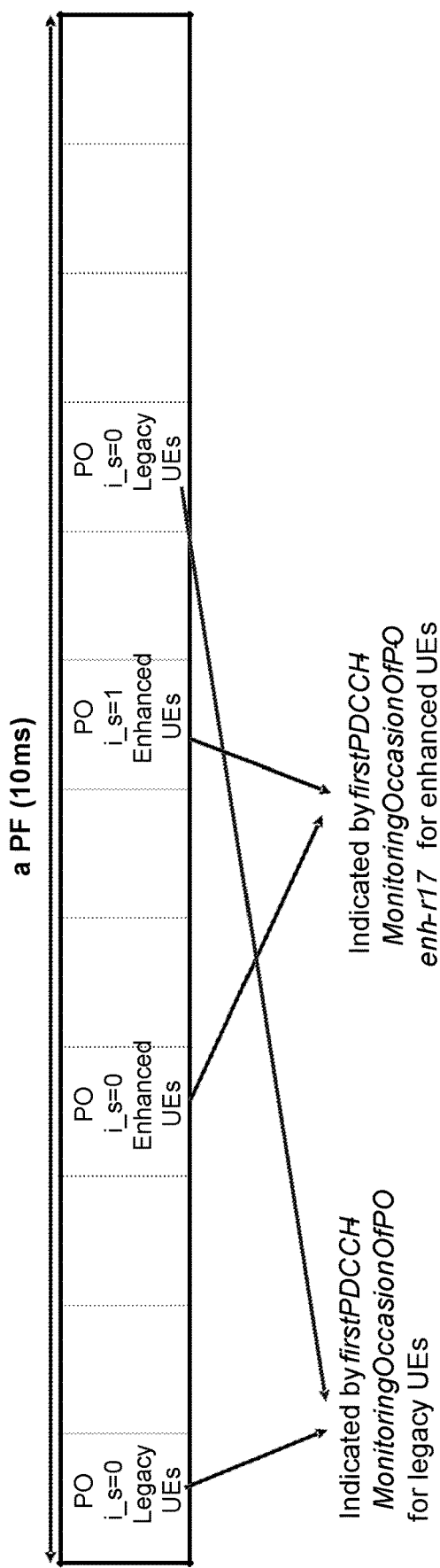
FIG. 11 depicts non-overlapping paging occasions between the legacy UEs and enhanced UEs when the first PDCCH monitoring occasion associated with a specific paging occasion is configured separately for the enhanced UEs, according to one aspect of the disclosure.

FIG. 11 depicts non-overlapping paging occasions between the legacy UEs and enhanced UEs when the first PDCCH monitoring occasion associated with a specific paging occasion is configured separately for the enhanced UEs, according to one aspect of the disclosure. The first PDCCH monitoring occasions parameter (firstPDCCH-MonaoringOccasionOfPO) is used when the paging procedure does not share the common search space with SIB1.

The number of paging occasions (Ns) may be configured to 2. The first PDCCH monitoring occasion for the legacy UEs is indicated by the parameter firstPDCCH-MonitoringOccasionsOfPO. The first PDCCH monitoring occasion for the enhanced UEs is separately indicated by the parameter firstPDCCH-MonitoringOccasionsOfPO-enh to occupy a different paging occasion from the paging occasion for the legacy UEs.

FIG. 12 illustrates an example of providing separate configuration parameters for the first PDCCH monitoring occasion for the enhanced UEs shown as information element firstPDCCH-MonitorOccasionOfPO-enh-r17 in the PCCH-Configuration structure, according to one aspect of the disclosure.

In one aspect, the network or the base station may configure any combination of the frame offset (PF_offset), the number of total paging frames (N) in each DRX cycle, the number of paging occasions (Ns), and the PDCCH monitoring occasions separately for the enhanced UEs when configuring the paging occasions. In one aspect, the separate parameters for the enhanced UEs may follow the corresponding parameters for the legacy UEs in the PCCH-Configuration structure. In one aspect, a PCCH-Configuration structure for the enhanced UEs may be duplicated based on the PCCH-Configuration structure for the legacy UEs to provide completely separate information elements for the enhanced UEs.

FIG. 13 illustrates an example of providing separate configuration parameters for the frame offset (PF_offset), the number of total paging frames (N) in each DRX cycle, the number of paging occasions (Ns), and the PDCCH monitoring occasions separately for the enhanced UEs in the PCCH-Configuration structure, according to one aspect of the disclosure. The information elements for the enhanced UEs are shown as information elements nAndPagingFrameOffset-enh-r17, ns-enh-r17, and firstPDCCH-MonitorOccasionOfPO-enh-r17.

Figure 14:
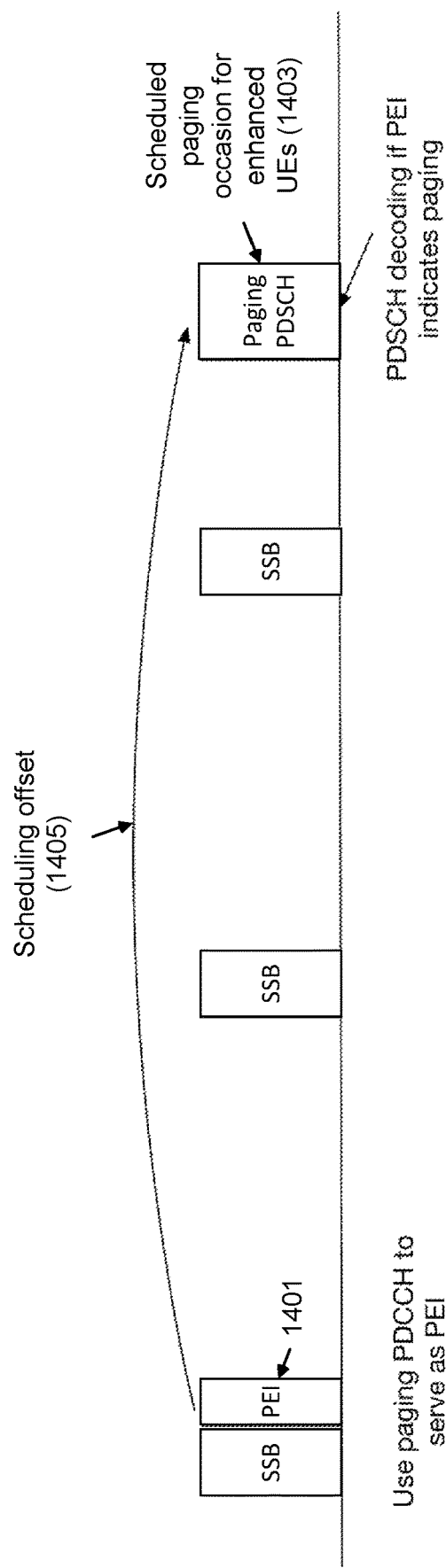
FIG. 14 depicts the paging occasions for the enhanced UEs when the network or the base station uses the paging PDDCH to serve as the paging early indication that is transmitted in advance of the paging occasions enhanced with a scheduling offset for the enhanced UEs, according to one aspect of the disclosure.

FIG. 14 depicts the paging occasions for the enhanced UEs when the network or the base station uses the paging PDDCH to serve as the paging early indication that is transmitted in advance of the paging occasions enhanced with a scheduling offset for the enhanced UEs, according to one aspect of the disclosure.

The network or the base station may use the separate paging parameters for the enhanced UEs and legacy UEs to design the PEI to save signaling overhead. In one aspect, after using the separate paging occasion configuration parameters to configure the enhanced UEs and legacy UEs with different paging occasions, the network may reuse the existing paging format (e.g., DCI format 1_0) for the paging PDCCH to serve as the PEI at time 1401 because the scheduled paging occasion for the enhanced UEs 1403 during which the enhanced UEs may listen for the paging PDCCH is not shared with legacy UEs. Thus, during the scheduled paging occasion for the enhanced UEs 1403, the paging PDCCH for the legacy UEs does not need to be transmitted. In one aspect, the network may configure a scheduling offset 1405 between the paging PDCCH serving as the PEI at time 1401 and the paging PDSCH containing the paging message for the enhanced UEs at the scheduled paging occasion for the enhanced UEs 1403. The scheduling offset 1405 may be a slot offset that may be used by the enhanced UEs to derive the slot in which the paging PDSCH is transmitted. The network or the base station may broadcast the scheduling offset 1405 in SIB as part of the paging configuration. In one aspect, the paging format for the paging early indication may be enhanced to provide sub-grouping for a group of enhanced UEs.

Figure 15:
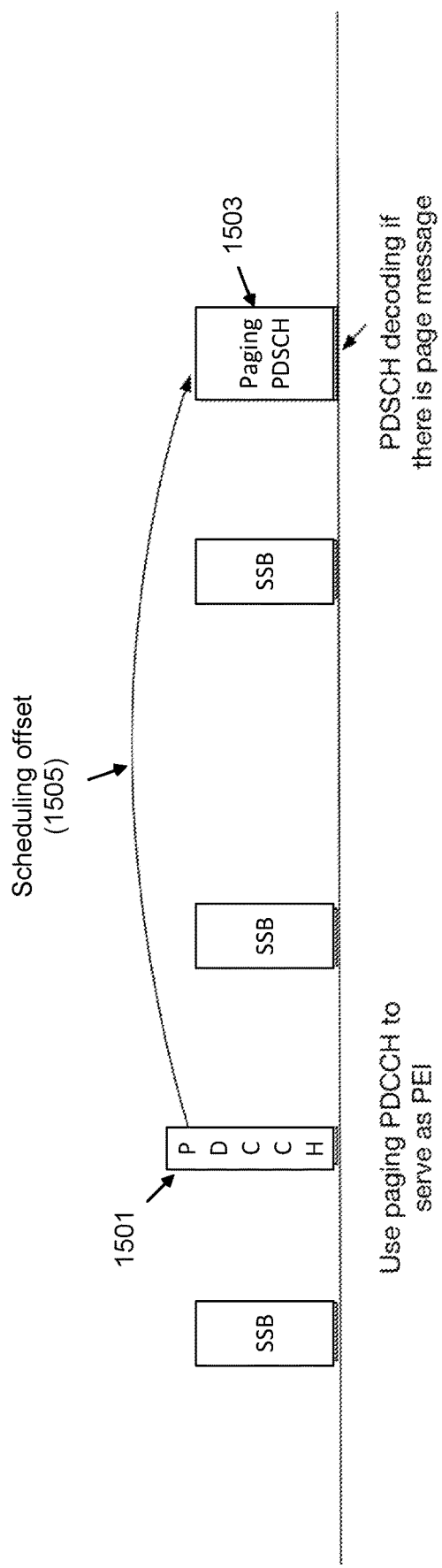
FIG. 15 depicts the paging occasions for the enhanced UEs when the network or the base station uses legacy paging PDCCHs at their current locations to serve as paging early indication enhanced with a scheduling offset for the enhanced UEs, according to one aspect of the disclosure.

FIG. 15 depicts the paging occasions for the enhanced UEs when the network or the base station uses legacy paging PDCCHs at their current locations to serve as paging early indication enhanced with a scheduling offset for the enhanced UEs, according to one aspect of the disclosure.

In one aspect, the network or the base station may keep the legacy paging PDCCH at its current position to serve as the PEI for the enhanced UEs at time 1501, which may be the scheduled paging occasion for the enhanced UEs. The legacy paging PDCCH does not contain the resource allocation for the legacy paging PDSCH containing the paging message for the legacy UEs because the legacy paging PDSCH is not monitored by the legacy UEs. The network or the base station may configure a scheduling offset 1505 between the legacy paging PDCCH serving as the PEI at time 1501 and the paging PDSCH containing the paging message for the enhanced UEs at time 1503. The network or the base station may similarly broadcast the scheduling offset 1505 in SIB as part of the paging configuration. The scheduling offset 1505 allows the paging PDCCH and the paging PDSCH to be separated far enough so that the paging PDCCH may serve as the PEI. After waking up, if the enhanced UE does not detect a paging PDCCH, the enhanced UE may go back to the low power mode immediately. Otherwise, the enhanced UE may continue with any needed detection of synchronization signals to synchronize its time and frequency and to detect the paging PDSCH.

Even through the network or the base station may design the paging structure to provide non-overlapping paging occasions for the legacy UEs and enhanced UEs to realize overhead saving, the enhanced UEs and the legacy UEs may still share the same paging occasions, albeit at forgoing the overhead saving associated with non-overlapping paging occasions.

Figure 16:
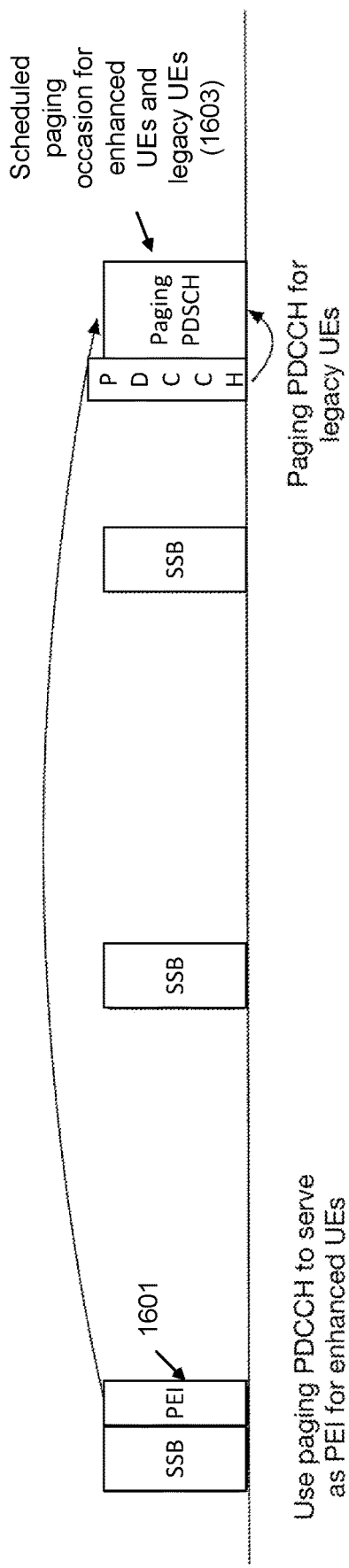
FIG. 16 depicts the paging occasions for the enhanced UEs and the legacy UEs sharing the same paging PCSCH containing the paging message when the network or the base station uses the paging PDCCH to serve as the paging early indication that is transmitted in advance of the paging occasions enhanced with a scheduling offset for the enhanced UEs, according to one aspect of the disclosure.

FIG. 16 depicts the paging occasions for the enhanced UEs and the legacy UEs sharing the same paging PCSCH containing the paging message when the network or the base station uses the paging PDCCH to serve as the paging early indication that is transmitted in advance of the paging occasions enhanced with a scheduling offset for the enhanced UEs, according to one aspect of the disclosure.

The paging PDCCH that serves as the paging early indication for the enhanced UEs at time 1601 is transmitted separately from the paging PDCCH for the legacy UEs. Both the legacy UEs and enhanced UEs share the same paging PDSCH, which may be occurring during the scheduled paging occasion for the enhanced UEs and the legacy UEs at time 1603.

Figure 17:
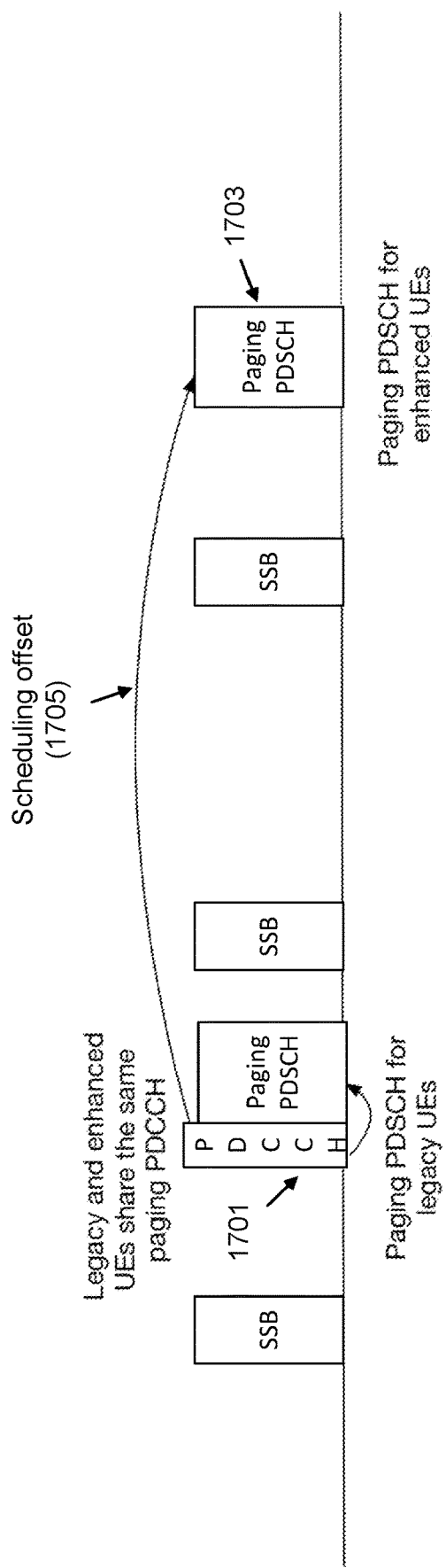
FIG. 17 depicts the paging occasions for the enhanced UEs and the legacy UEs sharing the same paging PCCCH when the network or the base station uses the legacy paging PDCCH at its current locations to serve as paging early indication enhanced with a scheduling offset for the enhanced UEs, according to one aspect of the disclosure.

FIG. 17 depicts the paging occasions for the enhanced UEs and the legacy UEs sharing the same paging PCCCH when the network or the base station uses the legacy paging PDCCH at its current locations to serve as paging early indication enhanced with a scheduling offset for the enhanced UEs, according to one aspect of the disclosure.

The legacy UEs and the enhanced UEs share the same paging PCCCH at time 1701, which may be the shared paging occasion between the legacy UEs and enhanced UEs, but in order to provide power saving for enhanced UEs, a separate paging PDSCH enhanced with the scheduling offset is transmitted for the enhanced UEs at time 1703. Because the same PCCCH is used to schedule two PDSCHs for the legacy UEs and enhanced UEs, the enhanced UEs may interpret the domain resource allocation differently from the legacy UEs by adding the scheduling offset 1705. In one aspect, since the legacy PDCCH may still need to be transmitted, the paging early indication may not have to use the same paging format as the PDCCH such as not carrying the full paging information. In one aspect, the paging early indication may carry other information such as sub-grouping information, paging early indications corresponding to multiple paging occasions, etc., to reduce payload size.

In one aspect, when the paging early information is used to indicate paging occasions for enhanced UEs that do not share paging occasions with legacy UEs, the paging early indication may carry the full paging information or have the same paging format as the PDCCH, so that no separate PDCCH needs to be transmitted. In one aspect, which types of paging early information the enhanced UEs should assume may be either explicitly configured via radio resource control such as through SIB, or implicitly derived based on the configuration, depending on whether the enhanced UEs are configured with separate paging occasions.

In one aspect, in addition to providing separate paging parameters for the enhanced UEs and legacy UEs, multiple sets of paging parameters may be provided for multiple groups or sub-groups of enhanced UEs. Each set of paging parameters may be associated with one group or sub-group of enhanced UEs to provide the network and the enhanced UEs with additional flexibility to configure or to utilize the enhanced feature of the PEI. There may be different ways to group the enhanced UEs. In one aspect, there may be separate groups or sub-groups for the enhanced UEs in the RRC idle mode or the RRC inactive mode. In one aspect, there may be separate groups or sub-groups for enhanced UEs with different power consumption requirements. For example, one group or sub-group may include enhanced UEs that are power sensitive and require low power consumption, and another group or sub-group may include the remaining enhanced UEs. In one aspect, there may be separate groups or sub-groups for enhanced UEs with different paging rate. For example, one group or sub-group may include enhanced UEs with normal to high paging rate (e.g., paging rate exceeding a threshold) and another group or sub-group may include UEs with low paging rate (e.g., paging rate below the threshold). In one aspect, the enhanced UEs may be grouped based on any combination of RRC mode, power consumption, paging rate discussed above or other criteria. An enhanced UE may know which group or sub-group to which it belongs based on, for example, predefined rules, a group or sub-group index indicated by the base station or the network, etc.

Separating the paging occasions for the legacy UEs and enhanced UEs allows the network to optimize or more effectively configure the paging occasions for the UEs in the network. In one aspect, if sub-groupings of UEs is supported in the paging DCI (e.g., DCI format 1_0 for the paging PDCCH) or the PEI, the network or the base station may put more enhanced UEs in the same paging occasion without affecting the sub-group paging rate (e.g., the probability that a paging message is addressed to any UE in the sub-group) for each enhanced UE. For example, assume that the paging rate for each UE is 1%, the network may configure the paging occasions such that 80 enhanced UEs share the same paging occasion. The 80 enhanced UEs may be divided into 8 sub-groups with 10 enhanced UEs in each sub-group. In this case, the sub-group paging rate is about 10% so that there is about a 10% probability that an enhanced UE needs to continue to decode paging PDSCH after receiving the PEI. On the other hand, if there are 80 UEs containing a mix of legacy UEs and enhanced UEs sharing the same paging occasion, the sub-group paging rate for the enhanced UEs is still about 10%. However, for legacy UEs, the group paging rate is about 55% so that there is about a 55% probability that a legacy UE needs to continue to decode paging PDSCH after receiving paging PDCCH. This would increase the power consumption of legacy UEs significantly. Therefore, configuring separate paging occasions for the enhanced UEs allows the network utilize the enhanced feature of the PEI and/or sub-grouping without adversely affecting the legacy UEs.

Figure 18:
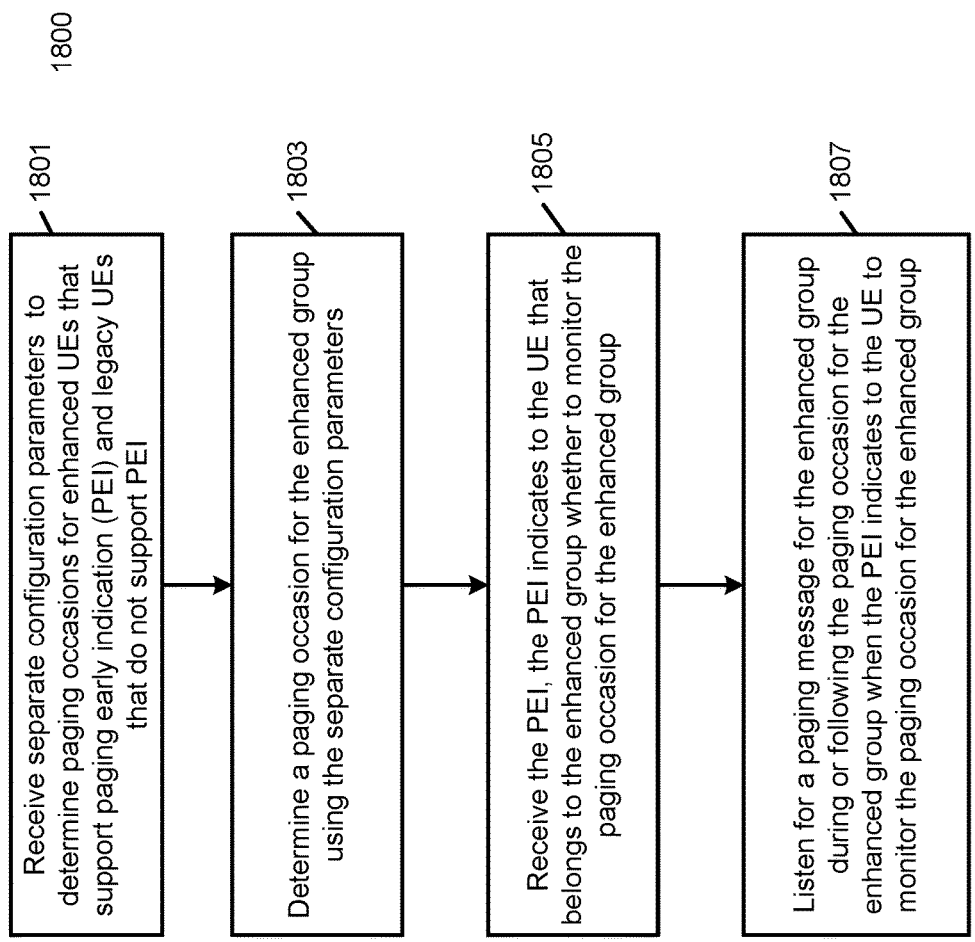
FIG. 18 depicts a flow diagram of a method for an enhanced UE to perform paging operations when separate configuration parameters are used to determine paging occasions for enhanced UEs and legacy UEs, according to one aspect of the disclosure.

FIG. 18 depicts a flow diagram of a method 1800 for an enhanced UE to perform paging operations when separate configuration parameters are used to determine paging occasions for enhanced UEs and legacy UEs, according to one aspect of the disclosure. The method may be practiced by the UE of FIGS. 1, 2, 3, 14, 15, 16, and 17.

In operation 1801, the UE receives from the network separate configuration parameters used to determine paging occasions for the enhanced UEs that support PEI and the legacy UEs that do not support PEI.

In operation 1803, the UE determines a paging occasion for the enhanced group using the separate configuration parameters.

In operation 1805, the UE receives from the network the PEI. The PEI indicates to the UE whether to monitor the paging occasion for the enhanced group.

In operation 1807, when the PEI indicates to the UE to monitor the paging occasion for the enhanced group, the UE listens for a paging message for the enhanced group transmitted by the network during or following the paging occasion for the enhanced group.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A baseband processor of a wireless user equipment (UE) configured to perform paging operations comprising:
receiving, from a base station, separate configuration parameters used to determine paging occasions for an enhanced group of UEs that support a paging early indication (PEI) and a legacy group of UEs that do not support the PEI, wherein the separate configuration parameters comprise one or more of: separate frame offsets (PF offset) for the enhanced group and the legacy group, separate numbers of total paging frames (N) in each discontinuous reception (DRX) cycle of radio frames for the enhanced group and the legacy group, separate numbers of the paging occasions (Ns) per paging frame for the enhanced group and the legacy group, or separate first paging control message monitoring occasions associated with the paging occasions for the enhanced group and the legacy group;
determining a paging occasion for the enhanced group and for the legacy group of UEs using the separate configuration parameters, including determining, based on the separate configuration parameters, that the paging occasion for the enhanced group and the paging occasion for the legacy group are overlapping;
listening for a shared paging control message during an overlapping paging occasion for the enhanced group and the legacy group, wherein the shared paging control message serves as the PEI and allocates resources for a paging message for the legacy group and for a paging message for the enhanced group, during when the paging occasion for the enhanced group and the paging occasion for the legacy group are overlapping;
receiving the shared paging control message which serves as the PEI from the base station, the PEI indicating to the UE to monitor the paging occasion for the enhanced group;
receiving a scheduling offset from the base station, wherein the shared paging control message precedes the paging message for the enhanced group by the scheduling offset to allow the shared paging control message to serve as the PEI; and
listening for the paging message for the enhanced group and for the legacy group of UEs transmitted by the base station during or following the paging occasion for the enhanced group when the PEI indicates to the UE to monitor the paging occasion for the enhanced group, wherein the paging message for the enhanced group is shared with the paging message for the legacy group.

2. The baseband processor of claim 1, further comprising: receiving a paging control message for the enhanced group transmitted by the base station when the paging occasion for the enhanced group and the paging occasion for the legacy group do not overlap, wherein the paging control message for the enhanced group allocates resources for the paging message for the enhanced group.

3. The baseband processor of claim 2, wherein the paging control message for the enhanced group precedes the paging message for the enhanced group by a scheduling offset to allow the paging control message for the enhanced group to serve as the PEI for the enhanced group, wherein the paging control message for the enhanced group is received in advance of the paging occasion for the enhanced group and the paging message for the enhanced group is received during the paging occasion for the enhanced group.

4. The baseband processor of claim 3,
wherein the scheduling offset is received from the base station as a broadcast message.

5. The baseband processor of claim 3, wherein the paging control message for the enhanced group reuses a paging format of a paging control message for the legacy group, wherein the paging control message for the legacy group allocates resources for the paging message for the legacy group transmitted by the base station during the paging occasion for the legacy group.

6. The baseband processor of claim 5, wherein the paging control message for the legacy group and the paging message for the legacy group are not transmitted during the paging occasion for the enhanced group.

7. The baseband processor of claim 2, wherein the paging control message for the enhanced group comprises separate paging control information for a plurality of sub-groupings of the enhanced group of UEs, wherein the plurality of sub-groupings of the enhanced group of UEs share the paging occasion for the enhanced group.

8. The baseband processor of claim 2, wherein the paging control message for the enhanced group precedes the paging message for the enhanced group by a scheduling offset to allow the paging control message for the enhanced group to serve as the PEI, wherein the paging control message for the enhanced group is received during the paging occasion for the enhanced group and the paging message for the enhanced group is received following the paging occasion for the enhanced group.

9. The baseband processor of claim 1, wherein the shared paging control message comprises separate paging control information for a plurality of sub-groupings of the enhanced group of UEs, wherein the plurality of sub-groupings of the enhanced group of UEs share the paging occasion for the enhanced group.

10. The baseband processor of claim 1, further comprising:
receiving, from the base station, second separate configuration parameters used to determine paging occasions for a plurality of sub-groupings of the enhanced group of UEs; and
determining a paging occasion for the UE using the second separate configuration parameters selected based on the sub-grouping to which the UE belongs.

11. The baseband processor of claim 1, further comprising:
entering a low power mode when the PEI indicates to the UE not to monitor the paging occasion for the enhanced group.

12. A user equipment (UE) comprising:
at least one antenna;

at least one radio, wherein the at least one radio is configured to communicate with a base station using the at least one antenna; and at least one processor coupled to the at least one radio, wherein the at least one processor is configured to perform paging operations comprising:

receive from the base station separate configuration parameters used to determine paging occasions for an enhanced group of UEs that support a paging early indication (PEI) and a legacy group of UEs that do not support the PEI, wherein the separate configuration parameters comprise one or more of: separate frame offsets (PF offset) for the enhanced group and the legacy group, separate numbers of total paging frames (N) in each discontinuous reception (DRX) cycle of radio frames for the enhanced group and the legacy group, separate numbers of the paging occasions (Ns) per paging frame for the enhanced group and the legacy group, or separate first paging control message monitoring occasions associated with the paging occasions for the enhanced group and the legacy group;

determine a paging occasion for the enhanced group and for the legacy group of UEs using the separate configuration parameters, including determining, based on the separate configuration parameters, that the paging occasion for the enhanced group and the paging occasion for the legacy group are overlapping;

listening for a shared paging control message during an overlapping paging occasion for the enhanced group and the legacy group, wherein the shared paging control message serves as the PEI and allocates resources for a paging message for the legacy group and for a paging message for the enhanced group, during when the paging occasion for the enhanced group and the paging occasion for the legacy group are overlapping;

receive from the base station the shared paging control message which serves as the PEI, the PEI indicating to the UE to monitor the paging occasion for the enhanced group;

receiving a scheduling offset from the base station, wherein the shared paging control message precedes the paging message for the enhanced group by the scheduling offset to allow the shared paging control message to serve as the PEI; and listen for the paging message for the enhanced group and for the legacy group of UEs transmitted by the base station during or following the paging occasion for the enhanced group when the PEI indicates to the UE to monitor the paging occasion for the enhanced group, wherein the paging message for the enhanced group is shared with the paging message for the legacy group.

\* \* \* \* \*